United States Patent [19]

Pelle et al.

[11] Patent Number: 4,776,783

[45] Date of Patent: Oct. 11, 1988

[54] PLASTIC INJECTION MOLDING APPARATUS

[75] Inventors: Theos R. Pelle; Bobby H. Allen, both of Louisville, Ky.

[73] Assignee: D.J. Inc., Louisville, Ky.

[21] Appl. No.: 829,493

[22] Filed: Feb. 14, 1986

[51] Int. Cl.$^4$ ............................................. B29C 45/73
[52] U.S. Cl. .............................. 425/190; 264/328.14; 264/328.16; 425/547; 425/552; 425/556; 425/590; 425/593
[58] Field of Search ............... 425/183, 185, 186, 190, 425/192 R, 547, 552, 556, 592, 593, 595, 143, 144, 407, 810, 590; 264/328.14, 328.16, 328.1

[56] References Cited

U.S. PATENT DOCUMENTS

| | | | |
|---|---|---|---|
| 2,447,101 | 8/1948 | Stock | 425/570 |
| 3,103,705 | 9/1963 | Letica | 249/158 |
| 4,158,910 | 6/1979 | Hanas et al. | 425/590 |
| 4,201,742 | 5/1980 | Hendry | 425/552 |
| 4,202,522 | 5/1980 | Hanas et al. | 425/186 |
| 4,330,248 | 5/1982 | Platte | 425/522 |
| 4,345,890 | 8/1982 | Hemmi et al. | 425/143 |
| 4,462,780 | 7/1984 | Stavitsky et al. | 425/143 |
| 4,545,757 | 10/1985 | Romi | 425/593 |

Primary Examiner—Jay H. Woo
Assistant Examiner—Timothy W. Heitbrink
Attorney, Agent, or Firm—Edward M. Steutermann

[57] ABSTRACT

Improved apparatus for plastic molding devices and more particularly for an improved injection plastic molding machine which uses mold inserts carried by pockets in the machinery where a first platen is provided having a first platen pocket to receive a first mold half to be located in communication with a source of plastic material for example thermoplastic material, a second platen having a second platen pocket adapted to receive a second mold half so that the second mold half can be moved to abutting relation with the first mold half to form a cavity defined by the first and second mold halves into which molten plastic material is injected. A source of cooling fluid can be provided through the first and second platen to the first and second mold halves utilizing seal devices between the first and second platens and the first and second mold halves respectively. Guide rails can be provided on opposite sides of the first and second platens and a crank mechanism can be provided to move the second the first platen.

5 Claims, 3 Drawing Sheets

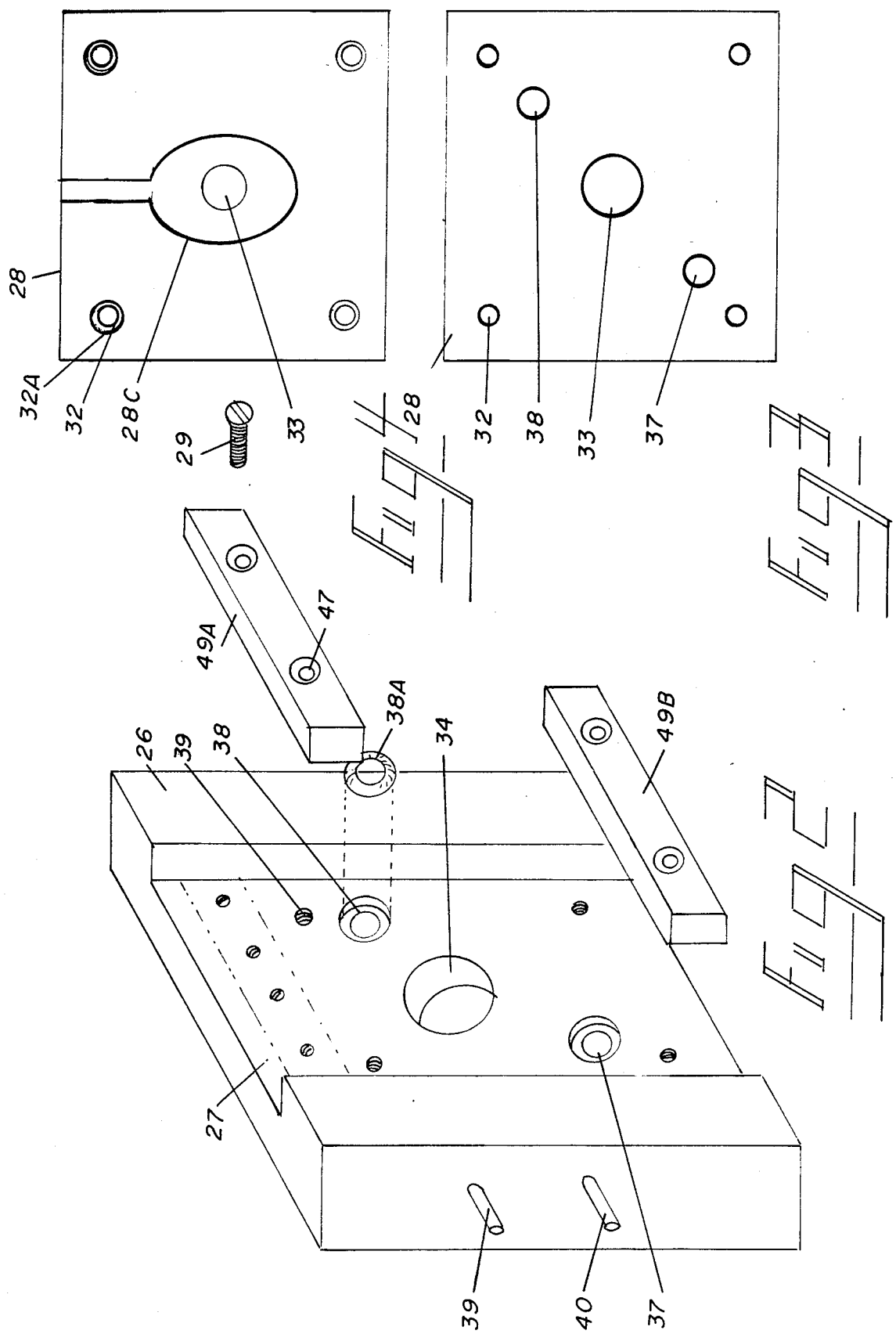

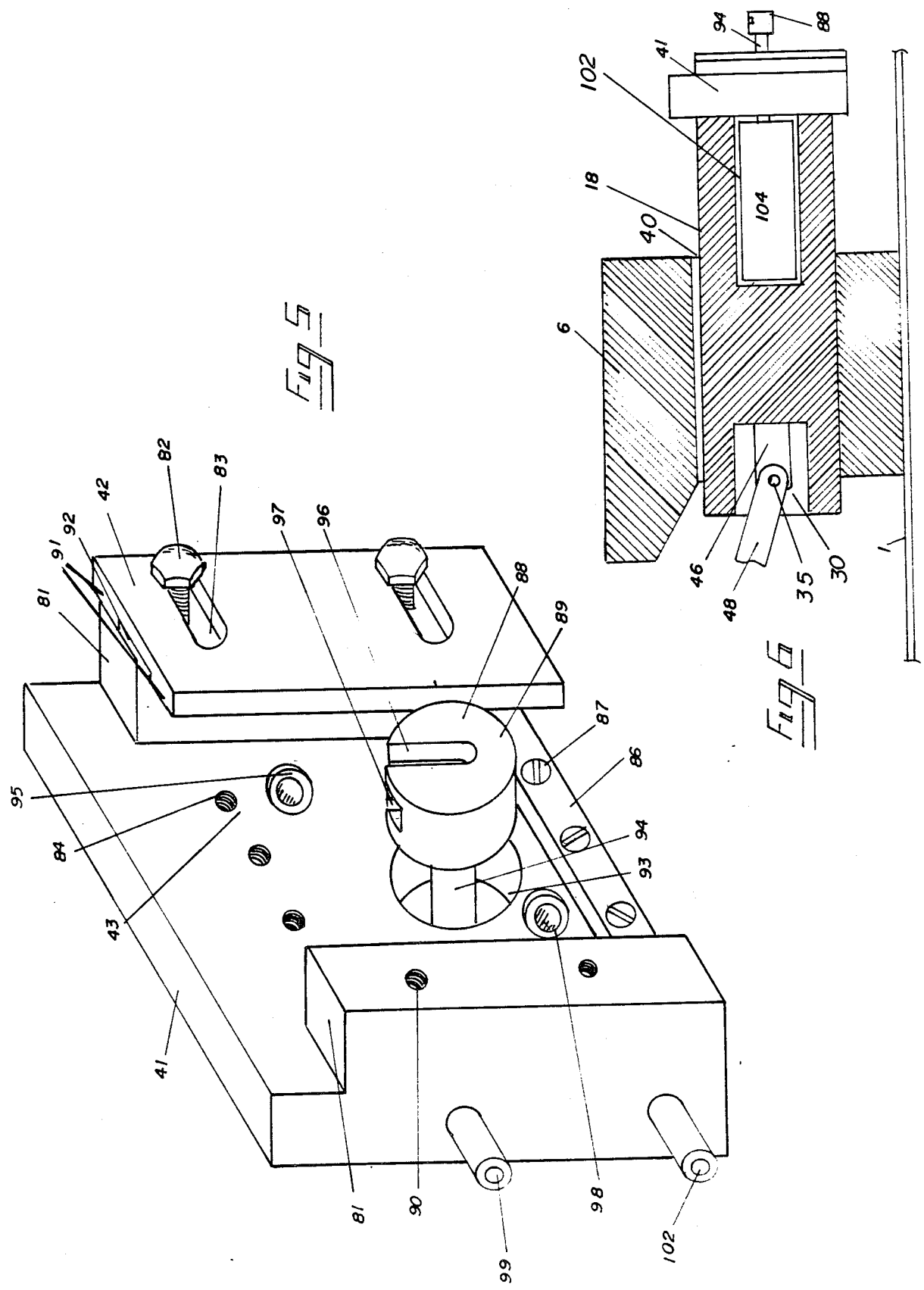

PLASTIC INJECTION MOLDING APPARATUS

BACKGROUND OF THE INVENTION

The present invention relates, in general, to plastic injection molding arrangement and more particularly relates to an improved mold arrangements which facilitate changing of mold halves for successive molding operations and allows the use of molding equipment of substantially reduced size and weight because of the elimination of bulky mold bases required by prior art devices. It is well known in the prior art to use a pair of bases for carrying respective halves of a pair of injection mold inserts which are clamped together along a confronting face parting line to form an internal injection molding cavity in the mold inserts. Injection means are provided for supplying molten plastic material to the cavity to form a desired injection molded product.

Examples of such prior art arrangements are manufactured by Master Unit Die Products of Greenville, Michigan and generally idenified as "MUD" frames and unit die inserts. These frames and inserts are designed to be used in matching pairs where the large frames each have a recess arranged to accommodate corresponding die or mold inserts. The confronting faces of the frames of the die or mold inserts determine the parting line of the molded product. The prior art taught that in order to maintain dimensional stability the frames had to be of heavy construction, generally steel, and in order to change from one die size to another die size the frame from the first die had to be removed from the machine and replaced with a frame for the second die insert. The frames were heavy and were bolted to the injection molding machine. Also where a coolant was utilized, the coolant source was connected to the frames and had to be disconnected when the frame was removed, thereby further complicating the operation and leading to increased labor cost. Further the frequent connection and disconnection of the coolant lines promoted leaks in the system.

U.S. Pat. Nos. 4,158,910 and 4,202,522 teach arrangements which can be used on several die inserts. However even the devices taught by these references are large and cumbersome. Changeover may occur daily or even more than once a day and the time spent in such changeover is a significant part of the cost of producing molded products. The arrangement shown in the references and the devices provided by Master Unit Die Products equally consume operator time in changeover.

Moreover, devices shown in the a forenoted references, and the Master Unit Die configurations, require heavy blocks to be moved in order to position the dies; whereas in order to facilitate operation of an injection molding operation it is desirable to minimize the forces required and the weight of the blocks which must be moved. Equally desirable is a means for quickly inserting and removing mold parts so that changeover from one operation to another is further facilitated and the time required for changover reduced.

An additional feature of the present invention is the recognition that in most prior art devices the base is first attached to the injection molding machine and then the mold is secured in the base. Inherent in such arrangements is the massive size of the devices which require larger framemachines to hold the devices and the attendant additional cost and labor.

Furthermore, prior art devices, including devices in accordance with the aforenoted references, require a relatively large barrel injection device which holds more material than necessary in devices in accordance with the present invention and since the material tends to degrade during storage there is an excessive loss of material due to degradation in the prior art devices.

Other arrangements relating to die assemblies are shown in U.S. Pat. No. 3,103,705; U.S. Pat. No. 2,447,101; U.S. Pat. No. 4,330,248;

No prior art arrangement is known which provides the advantages features set out applicants invention as disclosed hereinafter.

SUMMARY OF THE INVENTION

The present invention relates to an improved injection molding apparatus and process wherein molding dies are easily interchanged in a injection molding machine in order to facilitate changeover from one arrangement to another to minimize cost. Devices in accordance with the present invention further reduce loss of plastic material that occur in prior art arrangements which have larger volume delivery systems, and provide means to facilitate cooling of the mold parts used in injection molding. The present invention further permits the design and successful use of machines with less weight than required by prior art devices.

More particularly, devices within the scope of the present invention permit cooling of the mold parts without connecting, disconnecting and reconnecting water hoses or other coolant sources frequently, so that the loss of time due to changeover is even further reduced. The present invention provides devices which also provide inherent advantageous heat transfer and mold cooling characteristics so the efficiency of cooling operation is even further enhanced.

Moreover, arrangements within the scope of the present invention provide devices, which because of the decreased weight of the device, can be operated with significantly reduced power requirements.

Briefly, the present invention provides improved method and appartus for plastic molding devices and more particularly for an improved injection plastic molding machine which uses mold inserts carried by pockets in the machinery where a first platen is provided having a first platen pocket to receive a first mold half to be located in communication with a source of plastic material for example thermoplastic material, a second platen having a second platen pocket adapted to receive a second mold half so that the second mold half can be moved to abutting relation with the first mold half to form a cavity defined by the first and second mold halves into which molten plastic material is injected. A source of cooling fluid can be provided through the first and second platen to the first and second mold halves utilizing seal devices between the first and second platens and the first and second mold halves respectively. Guide rails can be provided on opposite sides of the first and second platens and a crank mechanism can be provided to move the second the first platen.

The accompanying drawings and description depict one arrangement within the scope of the present invention but it will be understood that various other arrangements also within the scope of the present invention will occur to those skilled in the art upon reading the disclosure set out hereinafter.

BRIEF DESCRIPTION OF THE DRAWINGS

In one example of an arrangement within the scope of the present invention shown in the accompanying drawings:

FIG. 2 is a enlarged perspective view of a half mold platen useful in arrangements of the type shown in FIG. 1;

FIG. 3 is a elevational view of one side of a half mold arrangement useful in devices of the type shown in FIG. 1;

FIG. 4 is a elevational view of the opposite side of the mold shown in FIG. 3;

FIG. 5 is a perspective view of an example moveable platen useful in a device of the type shown in FIG. 1, in partly exploded view; and FIG. 6 is a schematic illustration of a portion of a cross sectional view of a device of the type shown in FIG.

DESCRIPTION OF THE DRAWINGS

Figure 1:
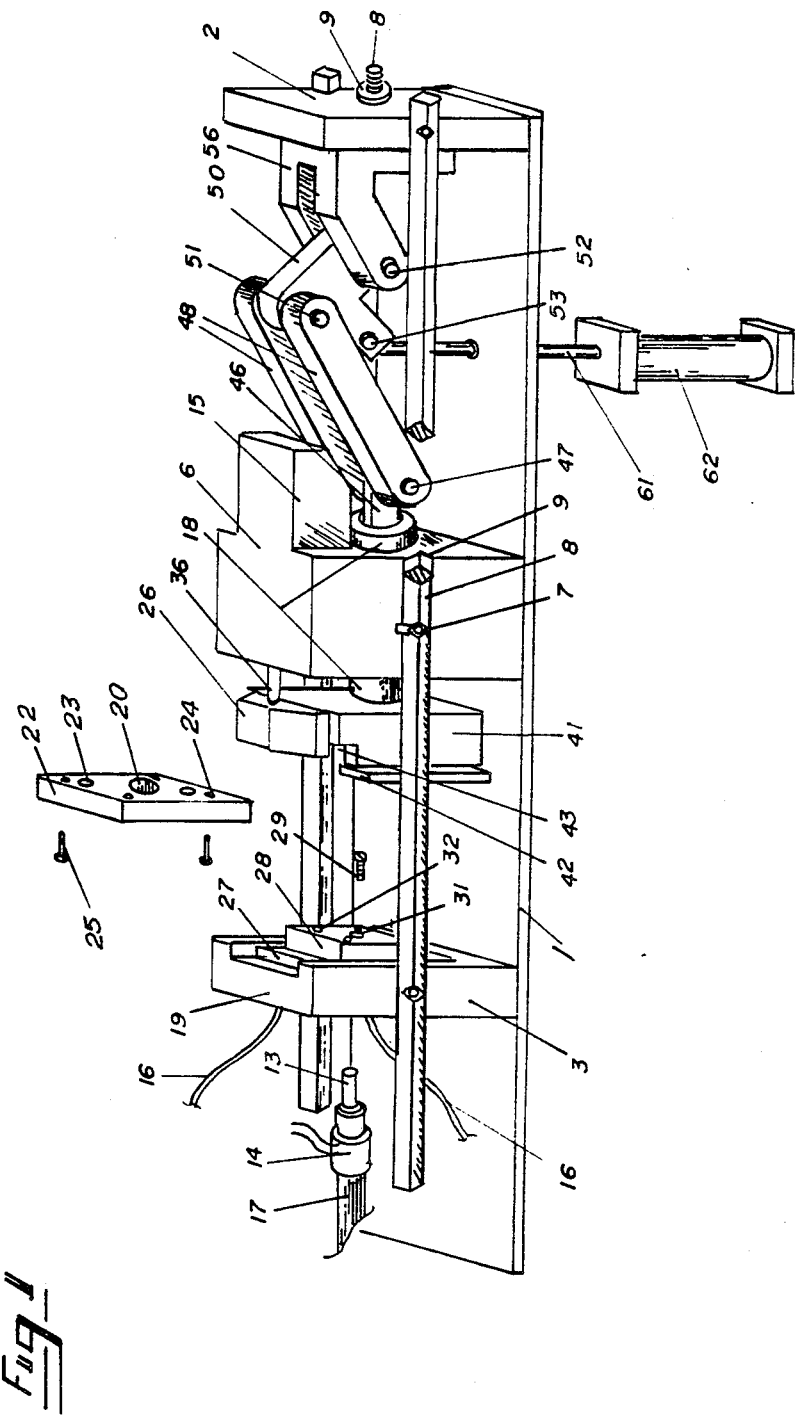
FIG. 1 is a perspective view of an injection molding machine within the scope of the present invention.

Referring first to FIG. 1 which is an illustration of one arrangement within the scope of the present invention, a base 1 is provided which receives an end plate 2 and a fixed platen 3. Platen 3 can be fixed to both base 1 and side rails 4 which run on opposite sides of the platen 3 and to end plate 2 to hold the devices carried thereby in fixed orientation.

Plastic can be supplied by means of a source conduit 17 through a heater 14 and supplied through an injector 13 to a mold as described hereinafter.

A platen bas 6 is provided and fixed to rails 4, for example by means of bolts 7 as shown. It will be understood that while the side rails 4 are shown in the accompanying drawings as being square and oriented with one of the pieces in a corresponding "V" groove 19 in the sides of the base 6 and corresponding grooves in end plate 2 and platen base 3 the side rails 4 can be rotated 90° so that a flat side of the side rail abuts the elements or in some instances even a round side rail could be utilized.

Turning first to the end plate 2 a yoke 56 is carried by the end plate and is moveable relative to the longitudinal axis of base 1 by means of a screw 8 and nut 9 so that the crank mechanism (described hereinafter) carried by the yoke 56 can be longitudinally adjusted as also described hereinafter.

A crank mechanism including lever 50 and a lever pair 48 are provided and are pinned together by means of a pin 52. Level pair 48 are connected by pin 47 to a shaft 46 connected (as described hereinafter to cylinder 18) which moves longitudinally bidirectionally. A lateral arm of lever 50 is connected by means of a pin 53 to a shaft 61 of a cylinder 62 which operates to extend and withdraw the overall length of the crank assembly 50, 48, and 46 to move a cylinder 18 which moves back and forth in a bore (not shown) in base 6 to extend and withdraw the moveable platen member 41 as described hereinafter.

Additionally, a rotation restricting block 26 can be provided atop platen 41 and extensible and retractable by pin 36 to engage platen 41 to prevent rotation of the platen 41 on the ram 18.

An extension 15 can be provided on base 6 to limit the length of the withdrawal of ram 18 from the base 6 by engagement between lever pair 48 and extension 15.

A rotation restricting block is received within a pocket 43 defined by a retainer arrangement in plate 21.

Also cooling means (not shown) including conduits 16 can be provided to the platen member 41 to supply the coolant to the mold half 22 by means of cooperative apertures 23 which can be adapted to receive seals where there are corresponding apertures in the platen member 41 provided with "O" rings to provide seals between the platen and the mold half to prevent leakage of coolant material from the passage between the platen 41 and mold half 22 where internal channels are provided within the mold half 22 to allow passage of fluid through the mold half to maintain the temperature of the mold half within selected limits.

As previously described fixed platen member 3 is carried by the side rails 4 and can be secured to the base 1. Platen member 3 as shown in more detail in FIG. 2 includes guide members 26a on opposite sides defining a channel 27 therebetween which is adapted to receive a mold half 28. Retainer blocks for mold 28 can be secured to plate 3 within the channel 27 by means of screws 29 to position the mold half 28. Screws can also be used to hold the mold half 28 in place on the face of platen 3 and can be received through cooperative holes 32 which can be counter sunk in recesses 32A to allow the heads of the screws to be located at or beneath the surface of the mold half to facilitate mold closure. As shown in FIG. 4 mold half 28 includes a cavity 28C to provide part of a half mold for a part of selected configuration to be manufactured in the device. Also a central aperture 33 is provided in the mold half 28 in communicative relation with an aperture 34 in the fixed platen member 3 to allow injection of the plastic material into the die cavity formed by the mold halves 22 and 28 when the ram 18 is fully extended so that the faces of mold halves 22 and 28 are in confronting relation.

Also openings 37, 38 are provided in the fixed platen 3 communicating with passageways 39 and 40 to allow coolant to flow to the fixed platen member and then to through the openings 37, 38 to the mold half. Seals, for example an "O" ring seals 38A can be provided in the opening 37, 38 to prevent coolant leakage.

In accordance with one feature of the present invention it is recognized that the passage of the cooling fluid through the fixed platen 3 and through the moveable platen 41 prior to introduction to the respective mold halves, and the surface contact between the fixed and moveable platens 41, and 3 respecfully, provides additional cooling to the mold halves and facilitates the maintenance of mold temperature during the molding operation.

Referring again to FIG. 2, the mold half 28 is received on the face of the platen member 36 within the channel 27 and secured thereto by means of screws 29 as previously described. Rotation restricting blocks 49A, 49B, can be provided above and below the mold half 28 to further enhance the stability of the arrangement and to provide a further deterrence to any possible misalignment of the mold half.

Referring now to FIG. 5 which is an illustration of one arrangement of a moveable platen member in accordance with the present invention, the platen member 41 is shown with spacers 81, carried by the platen member 41 defining a channel 43 therebetween which receives the mold member 22. Clamps 42, are provided to be received on the spacers 81, and held thereto by means of bolts 82 received in tapped bores 90. Advantageous, the clamps 42 can include bearing surfaces 91 one of which bears on the spacers 81, the other which bears on the mold half 22 when in location in the channel formed between the spacers B1. Also the depth of the spacers 81, is advantageously equal to the width of the mold half 22 so that the mold half is maintained rigidly in position. Coolant apertures 95, 98 are provided in the face of the platen 41 to communicate with flow passages 23, carried by mold half 22, which are similar to the passageways 37, 38 of the fixed platen 3. The coolant fluid flows through internal channels (not shown) in the platen 41 from flow parts 102 and 99 to the flow passageway 23 of the mold half 22 to allow cooling of the mold half both by the flow of coolant through and by conduction from platen 41.

As shown in FIG. 5 an ejector shaft 84 is provided through an opening 93 to carry a slotted retainer member 88 which includes slots 96 and 97 adapted to connect to ejector pins carried within the die opening 20 of die 22 as is known in the art, so that after full extention of the ram 18, and withdrawal of the ram to a preselected position the ram 94 is extended to exercise the ejector pins to emit the part from the cavity all is known in the art but shown in some detail in FIG. 6.

Also mold half retainer block 86 can be provided at the bottom of the platen 41 and retain by means of screws 87.

Referring now to FIG. 6 which illustrates schematically a part of the arrangement within the scope of the present invention for location of the ejector pin shaft, and now the crank member 46 is received within an opening 30 in the ram 18 and pinned thereto by means of a pin 35. The extension and retraction of ram 18 occurs as a result of the actuation of the cylinder 62 as previously described to move the ram 18 within cooperative aperture 40 provided within the fixed platen 6 to extend and withdraw the moveable platen 41. A second cylinder 104 is provided within a bore 102 provided in ram 18 and actuated by means of, for example, hydraulic fluid supplied by means of lines (not shown) to extend and withdraw the shaft 94 which carries the connector 88 within the moveable platen 41 and connects to the ejector pin carried by the mold half 41.

It will be understood that the foregoing is an illustration and description of but one arrangement within the scope of the present invention and that other arrangements also within the scope of the present invention will occur to those skilled in the art upon reading the disclosure set forth hereinafter.

The invention claimed is:

1. Improved apparatus for plastic injection molding, said apparatus including a base; a first platen having a first plate pocket to receive a first mold half, the first mold half and the first platen each having an aligned molten plastic inlet and first aligned mold internal coolant conduit means; a source of plastic material, said source having an outlet to communicate with said molten plastic inlet of said first platen; a second platen having a second platen pocket adapted to receive a second mold half, the second platen and the second mold half having aligned internal coolant conduit means where said second platen is adapted to move said second mold half in a direction of movement so as to be in a abutting relation with said first mold half to form a cavity defined by the first and second mold halves into which molten plastic material is injected from said source of plastic material; and a source of cooling fluid communicating with said first and second mold internal conduit means to flow through said first and second platens to internal conduit means in said first and second molds, said apparatus further including seal means between said first platen and said first mold and said second platen and said second mold respectively.

2. The invention of claim 1 including crank means provided to move said second platen toward said first platen.

3. The invention of claim 2 wherein said crank means is connected to cylinder means to move said cylinder means and where said second platen is carried at the end of said cylinder means.

4. The invention of claim 3 including bored base means, said bored base means including a bore of diameter to receive said cylinder means to guide said cylinder means in a direction parallel the direction of movement of the second platen.

5. The invention of claim 4 wherein said cylinder means includes central opening to receive extensible retractable power means having output shaft means to selectively engage said second mold where said second mold includes part ejector means to eject parts formed in said first and second molds.

* * * * *